April 10, 1928. 1,665,890
R. MICHL
SYNCHRONOUS MOTOR SPECIALLY FOR DRIVING CLOCKS
Filed June 10, 1925 2 Sheets-Sheet 1
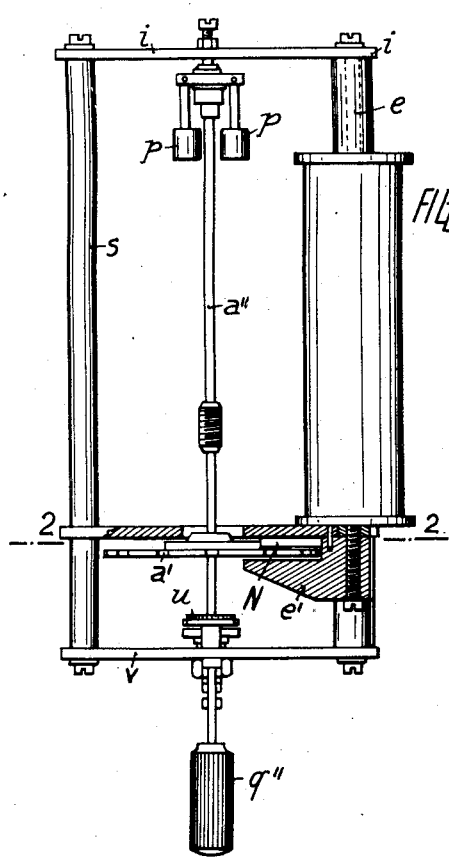
FIG. 1.
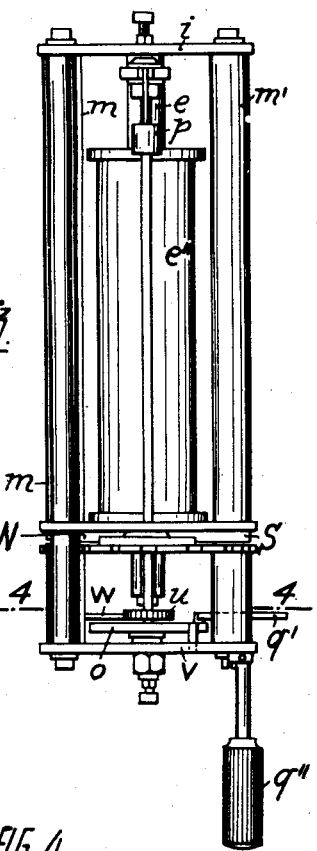
FIG. 3.
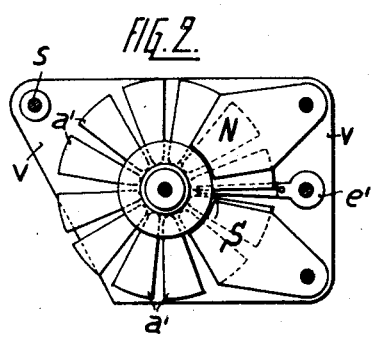
FIG. 2.
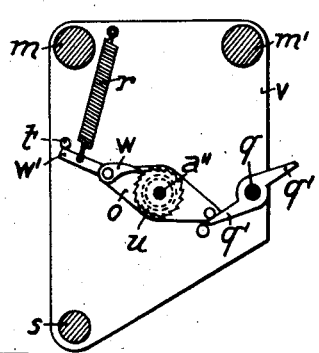
FIG. 4.
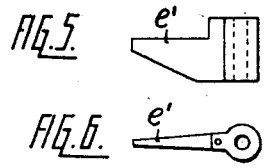
FIG. 5.
FIG. 6.

April 10, 1928. 1,665,890
R. MICHL
SYNCHRONOUS MOTOR SPECIALLY FOR DRIVING CLOCKS
Filed June 10, 1925 2 Sheets-Sheet 2
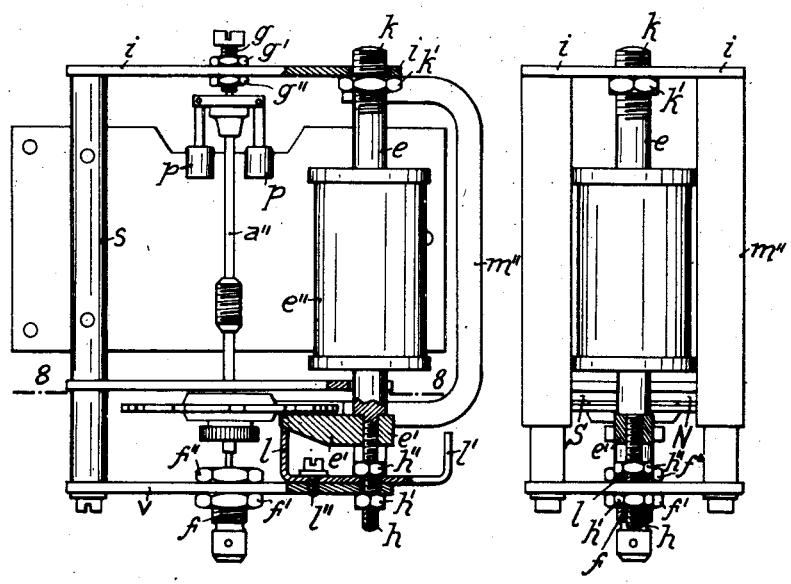
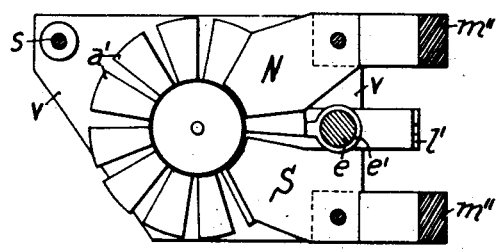

Patented Apr. 10, 1928.

1,665,890

UNITED STATES PATENT OFFICE.

ROBERT MICHL, OF KOSICE, CZECHOSLOVAKIA.

SYNCHRONOUS MOTOR SPECIALLY FOR DRIVING CLOCKS.

Application filed June 10, 1925, Serial No. 36,275, and in Germany June 13, 1924.

This invention relates to synchronous motors of small size adapted for instance for the driving of small sized mechanisms, like clocks, current meters and for other purposes. In order to improve the degree of efficiency of the motor for driving clocks or to reduce the consumption of current to the lowest possible limit, the poles of the exciter magnets and the alternating poles of the electromagnet are arranged on different sides of the rotor or of its segments. The magnetic lines of force can thus not pass directly between the magnet poles but are equalized only across the rotor segments.

Another characteristic feature for increasing the degree of efficiency is the adjustability of the width of the air gap of the rotor-iron-segments between the pole shoes of the permanent exciter magnets, on the one hand, and the alternating poles of the electromagnet, on the other hand. A low and flat construction of the motor is further obtained by the lateral bulging out of the permanent magnets which serve at the same time as supports.

Another characteristic feature of the invention is the starting mechanism for hand service designed for the starting of the motor. A pawl engaging, at the starting, with a ratchet wheel on the rotor shaft, has a separate arm onto which the starting spring acts. The engaging of the pawl at the rotation of the starting knob and the disengaging after the starting rotation is terminated, are controlled by stops for the oscillating lever of the pawl and for the spring controlled arm of the same, said stops being displaced the one with regard to the other. Two embodiments of the invention are illustrated, by way of example, in the accompanying drawings, in which:—

Fig. 1 shows the simplest form of construction of the synchronous motor in side elevation.

Fig. 2 is a top plan view, in section on line 2—2 of Fig. 1.

Fig. 3 is a side elevation taken at an angle of 90° with regard to Fig. 1.

Fig. 4 is a plan view in section on line 4—4 of Fig. 3.

Figs. 5 and 6 illustrate a constructional detail in side elevation and in plan view.

Fig. 7 shows another form of construction of the synchronous motor partly in side elevation and partly in vertical section.

Fig. 8 is a top plan view in section on line 8—8 of Fig. 7.

Fig. 9 is a side elevation partly in section taken at an angle of 90° with regard to Fig. 7.

As shown in Figs. 1–3 the permanent magnet consists of straight steel rods $m$ and $m'$ which serve at the same time as pillars for the motor. A third pillar $s$ is further provided. The neutral point of the permanent magnet is formed by an upper cover plate $i$ stamped from sheet iron with which the top end of the iron core $e$ of the electromagnet is connected by screwing, between the two steel magnet rods $m$, $m'$, and magnetically coupled with said plate. The lower ends of the magnet rods $m$ and $m'$ or the free poles are screw connected with the plate-shaped pole shoes N and S, as shown in Fig. 2. Between the same is located the pole nose $e'$ of the electromagnet, which pole nose is however not situated in the same plane of rotation but so much deeper that the rotor segments $a'$ on the rotor as shown in Fig. 1 can rotate between the pole nose $e'$ arranged underneath and the two pole shoes N and S arranged above. As the pole nose $e'$ of the electromagnet $e$ and the pole shoes N and S of the permanent magnet rods are no longer close together but separated by the rotor rotating between the same, there does not take place any longer a direct equalizing of magnetic lines of force between the magnet poles but this equalizing can have its full effect only across the rotor segments, whereby the degree of efficiency of the motor is increased.

The form of construction shown in Figs. 7 to 9 corresponds essentially to the above described with the difference, however, that, in order to obtain as flat a construction of the synchronous motor as possible, the permanent magnet rods $m''$ and $m''$ are curved in outward direction. By this arrangement the advantage is obtained that the alternating current coil $e''$ can be arranged in this bulged out portion. For the steel magnets $m''$ the desired axial length and a correspondingly greater magnetical tension is thus obtained.

In order that the air gap between the rotor iron segments $a'$ and the permanent exciter poles, N and S, and the alternating pole shoe $e'$ may be as narrow as possible the rotor shaft $a''$, on the one hand, and the electromagnet $e$, on the other hand, are adjustable in axial direction. On the rotor shaft $a''$ the two bearings are adjustable by means of the screw threads $f$ and $g$ and the counternuts $f'$, $f''$ and $g'$, $g''$ respectively, while the nose shaped pole shoe $e'$ of the electromagnet $e$ is adjustable by means of the threads $h$ and $k$ and of the corresponding counternuts $h'$, $h''$ and $k'$. The air gap on either side can thus be reduced to the narrowest width. In order to ensure a resilient clamping action of the upper counternut $k'$ and in order to avoid eddy currents in the same it is advisable to cut the same open at one point of its circumference. As the magnetic effect upon the iron segments $a'$ of the rotor decreases in square proportion to the width of the air gap on the magnet poles the accurate adjusting of this air gap to the narrowest possible width is of great importance. In order to obtain the most favourable power effect it is further important that the nose-shaped pole shoe $e'$ of the electromagnet $e$ seen from above be situated exactly at the middle between the two pole shoes N and S of the permanent exciter magnet. In order to ensure the accurate adjusting a tongue $l$ of nonmagnetic material is mounted on the lower step bearing plate $v$ which is also made from non-magnetic metal, for instance brass, so that it can be adjusted by being pivoted around the screw stud $h$ with the aid of a counterarm $l'$ and adapted to be fixed in position by means of the screw $l''$. With this object in view the tongue $e$ has an arc shaped slit for the reception of the screw $l''$ and is fork shaped at the upper vertical end, said end embracing the pole shoe $e'$.

The mechanism for starting the synchronous motor by hand consists of a small two-armed lever $o$, which is pivotally mounted in a step-bearing sleeve of the rotor fixed in the bed plate $v$. The two arms of this lever are displaced 180°. On one arm the pawl $w$ is pivotally mounted, a finger $q'$ acting upon the other arm, so that when this finger $q'$ is turned with the aid of the milled knob $q''$ the two-armed lever $o$ can be operated. A spring $r$ is attached with one end to the lever $w'$ of the pawl $w$. By the pull of the spring $r$ the arm $w'$ of the pawl $w$ is pressed against the abutment pin $t$ and if the pull of the spring continues the pawl $w$ is disengaged from the ratchet wheel $u$ when the two-armed lever $o$ strikes against the abutment pin $t$, the position of rest being thus attained in which the ratchet wheel $u$ can freely rotate.

If, after the current coil of the electromagnet $e$ has been connected with an alternating current line, the knob $q''$ is rotated for putting the spring $r$ under tension so that one of the fingers $q'$ releases the two-armed lever $o$, the pawl $w$ is first pressed by the tension of the spring $r$ into engagement with the ratchet wheel $u$ and the latter gives an impulse to the rotor which will be rotated at a speed exceeding the normal speed, then the motor slows down until it has reached the normal number of revolutions when it drops into synchronism and continues to run synchronously.

I claim:—

1. A synchronous motor, comprising in combination, a disk-like rotor formed of spaced segments, two exciter magnets the pole shoes of which are situated in a plane adjacent and parallel to the plane of rotation of said rotor segments, and an alternating current electromagnet the pole nose of which is situated in another plane adjacent and parallel to but on the other side of the plane of rotation of said rotor segments.

2. A synchronous motor, comprising in combination, a disk-like rotor formed of spaced iron segments, a rotor shaft, two exciter magnets the pole shoes of which are situated in a plane adjacent and parallel to the plane of rotation of said rotor segments, an alternating current electromagnet the pole nose of which is situated in another plane adjacent and parallel to but on the other side of the plane of rotation of said rotor segments, a threaded upper portion and a threaded lower portion of said alternating current electromagnet, and two counternuts on each of said threaded portions of said alternating current electromagnet for narrowing the air-gap between said segments and said pole-nose.

3. A synchronous motor, comprising in combination, a disk-like rotor formed of spaced iron segments, a rotor shaft, two exciter magnets the pole shoes of which are situated in a plane adjacent and parallel to the plane of rotation of said rotor segments, an alternating current electromagnet the pole nose of which is situated in another plane adjacent and parallel to but on the opposite side of the plane of rotation of said rotor segments, a threaded upper portion and a threaded lower portion of said rotor shaft, counternuts on each of said threaded portions of said rotor shaft, a threaded upper portion and a threaded lower portion of said alternating current electromagnet, two counternuts on each of said threaded portions of said alternating current electromagnet for narrowing the air-gap between said segments and said pole-nose, an adjustable tongue loosely mounted on said alternating current electromagnet, and a fork shaped upwardly directed arm of said tongue gripping the pole nose of said electromagnet for adjusting the same in the proper position between the pole shoes of said exciter magnet.

4. A synchronous motor, comprising in combination, a disk-like rotor formed of spaced iron segments, two exciter magnets the pole shoes of which are situated in a plane adjacent and parallel to the plane of rotation of said rotor segments, said exciter magnets being bowed out in outward direction in order to make the motor as flat as possible.

In testimony whereof I affix my signature.

ROBERT MICHL.